(12) United States Patent
Chou

(10) Patent No.: US 8,741,209 B2
(45) Date of Patent: Jun. 3, 2014

(54) STABILIZERS FOR CERAMIC BODY EXTRUSION

(75) Inventor: Kevin Ying Chou, Painted Post, NY (US)

(73) Assignee: Corning Incorporated, Corning, NY (US)

( * ) Notice: Subject to any disclaimer, the term of this patent is extended or adjusted under 35 U.S.C. 154(b) by 404 days.

(21) Appl. No.: 11/998,634

(22) Filed: Nov. 30, 2007

(65) Prior Publication Data
US 2009/0143219 A1   Jun. 4, 2009

(51) Int. Cl.
*B28B 3/20* (2006.01)
*C04B 35/632* (2006.01)

(52) U.S. Cl.
USPC ........................................... 264/630

(58) Field of Classification Search
CPC  C04B 35/194; C04B 35/622; C04B 35/6325; C04B 38/0006; C04B 2235/96; C04B 2235/6021; C04B 2111/00129; B28B 2003/203
USPC ................................. 264/630, 631
See application file for complete search history.

(56) References Cited

U.S. PATENT DOCUMENTS

| | | | | | |
|---|---|---|---|---|---|
| 4,201,594 | A | * | 5/1980 | Walters et al. | 106/38.35 |
| 4,632,683 | A | * | 12/1986 | Fukutani et al. | 55/523 |
| 5,023,217 | A | * | 6/1991 | Everhart et al. | 501/103 |
| 5,922,272 | A | * | 7/1999 | Sambrook et al. | 264/638 |
| 5,966,582 | A | * | 10/1999 | Chalasani et al. | 419/34 |
| 2003/0151174 | A1 | * | 8/2003 | Makino et al. | 264/631 |
| 2006/0135343 | A1 | * | 6/2006 | Ohno et al. | 501/80 |

OTHER PUBLICATIONS

Chu, T.-M. G. and Halloran, J. W. (2000), High-Temperature Flow Behavior of Ceramic Suspensions. Journal of the American Ceramic Society, 83: 2189-2195.*
U.S. Appl. No. 60/930,239, filed May 15, 2007, Raja Rao Wusirika.
E. Sjöström et al., "Chemistry of Delignification with Oxygen, Ozone, and Peroxides", Uni. Pub. Co., Tokyo, 1980, p. 61-77.

* cited by examiner

*Primary Examiner* — Joseph S Del Sole
*Assistant Examiner* — Erin Snelting
(74) *Attorney, Agent, or Firm* — John L. Haack

(57) ABSTRACT

A mixture for making a ceramic article includes a ceramic forming component, a liquid vehicle, a cellulosic binder, and a stabilizer comprising an acetate salt. The disclosure also provides a method of making the ceramic article including extruding the mixture to form a ceramic green body, drying the ceramic green body to remove at least a portion of the liquid vehicle, and optionally firing to form the ceramic article. The ceramic green body possesses excellent strength and excellent skin properties without increasing the organic load or the addition of hydrated clays.

2 Claims, No Drawings

STABILIZERS FOR CERAMIC BODY EXTRUSION

The entire disclosure of any publications, patents, and patent documents mentioned herein are incorporated by reference.

BACKGROUND

The disclosure relates to a mixture for stabilizing an extrusion of a ceramic green body and, more particularly to a porous ceramic green body such as a honeycomb ceramic green body. The disclosure also concerns a method for extruding the mixture and an article made therefrom.

SUMMARY

The disclosure provides a stabilizing mixture that includes a ceramic forming component, a liquid vehicle, a cellulosic binder, and an acetate salt stabilizer.

The disclosure also provides methods for extruding the mixture to form a ceramic green body, and methods for processing the ceramic green body to a ceramic article.

DETAILED DESCRIPTION

Various embodiments of the disclosure will be described in detail with reference to drawings, if any. Reference to various embodiments does not limit the scope of the invention, which is limited only by the scope of the claims attached hereto. Additionally, any examples set forth in this specification are not limiting and merely set forth some of the many possible embodiments for the claimed invention.

The indefinite article "a" or "an" and its corresponding definite article "the" as used herein means at least one, or one or more, unless specified otherwise.

"Include," "includes," or like terms means including but not limited to.

"About" modifying, for example, the quantity of an ingredient in a composition, concentrations, volumes, process temperature, process time, yields, flow rates, pressures, and like values, and ranges thereof, employed in describing the embodiments of the disclosure, refers to variation in the numerical quantity that can occur, for example, through typical measuring, computation, dispensing, or like procedures; through inadvertent error in these procedures; through differences in the manufacture, source, or purity of starting materials or ingredients used to carry out the methods; and like considerations. The term "about" also encompasses amounts that differ due to, for example, aging of an ingredient, intermediate, or product having a particular initial concentration, mixture, morphology, or topography, and amounts that differ due to processing a formulation with a particular initial concentration, mixture, morphology, or topography. Whether modified by the term "about" the claims appended hereto include equivalents to these quantities.

"Optional" or "optionally" or like terms generally refer to, for example, that the subsequently described event or circumstance can or cannot occur, and that the description includes instances where the event or circumstance occurs and instances where it does not.

"Consisting essentially of" in embodiments refers, for example, a method of forming a ceramic green body as defined herein; a mixture for forming a ceramic green body as defined herein; and a ceramic article prepared by the process or method as defined herein, and can include the components or steps listed in the claim, plus other components or steps that do not materially affect the basic and novel properties of the composition, article, apparatus, system, and method of making and use of the disclosure, such as a particular reactant, a particular additive or ingredient, a particular agent, a particular surface modifier or condition, a particular salt, or like structure, material, process, or computational variable selected.

Various methods exist to produce green ceramic bodies. One method includes extruding a ceramic mixture through a die to form a ceramic green body. The ceramic green body is typically dried and then fired at an elevated temperature to produce a ceramic article. Extrusion can produce a variety of ceramic articles including both solid and porous articles, for example, rods, tubes, blocks, catalyst supports, filters, and like articles.

The ceramic mixture often comprises a ceramic forming component, a liquid vehicle, and a binder. The properties desired of the ceramic article can often determine the selection of the ceramic forming component. For example, the ceramic forming component will be a refractory material if the article is to be used in refractory applications. The liquid vehicle is frequently water but may also include other volatile liquids such as alcohols, glycerin, and even organic solvents. The binder is added to give the ceramic mixture sufficient strength during the extrusion process and before firing. Cellulosics are commonly used when the liquid vehicle consists essentially of water. Cellulosics includes alkyl substituted cellulosic, such as methylcellulose.

Extrusion requires the green body to have sufficient strength to avoid dimensional changes caused by, for example, slumping, handling, or processing. Strength may be increased by the addition of binder but may be off-set by deteriorating surface features. As increasing amounts of binder are added to the mixture, the outer surface, or skin, of the ceramic green body may develop imperfections such as cracks, ridges, or chatter lines. Skin imperfections are more than an aesthetic issue and can cause cracking in the fired ceramic article. The selection of the composition of the pre-extrusion mixture has typically compromised ingredients providing either improved strength or skin properties to the resulting ceramic green body.

A solution to this problem has been to incorporate hydrous clays into the mixture. Hydrous clays increase plasticity and elasticity of the mixture, and have been used at levels of up to 40 wt. % of the ceramic forming component. Hydrous clays can improve skin properties, but the bound water in hydrous clays complicates drying and firing. In fact, bound water in the hydrous clays can significantly increase cracking of the ceramic article during firing.

Strength and skin imperfections are of special concern in the extrusion of porous ceramic green bodies such as honeycomb ceramic green bodies. Porosity decreases the volume of material in an article and so decreases the strength of the article. Porosity also increases the surface area of the article so the chance for skin imperfections is exacerbated. In one example, a mixture comprising a plurality of ceramic forming components, water, and methylcellulose binder is extruded to form a honeycomb ceramic green body. Too much binder produces a green body with excellent strength but with significant skin imperfections. Too little binder produces a green body with a smooth skin relatively free of surface imperfections but with insufficient strength so that the pores can collapse and the green body can distort.

Extruding porous ceramic green bodies calls for precise control of materials and processes in order to maintain strength and avoid skin imperfections, such as fissures, air checks, skin loss, skin-web separation, and cell distortion. In mixtures comprising a water liquid vehicle and a cellulosic binder, the mixture should have a sufficient amount of binder for handle-ability and slump resistance. An excessive amount of binder, however, can have negative consequences on the manufacturing process and the finished ceramic article, such as cracking. Cellulosics are also incompatible with certain ceramic compositions and so restrict the ceramic forming components that can form an acceptable mixture.

Known extrusion processes have shown an inverse relationship between good strength and skin properties. Known additives, such as clays, have partially overcome this situation but can complicate later processing.

In embodiments, the disclosure provides a method of extruding a green ceramic body where the mixture imparts to the green ceramic body excellent strength and skin properties. The green ceramic body preferably should be capable of being fired to form the ceramic article without a significant increase in cracking.

The disclosure includes a green body forming mixture comprising a ceramic forming component, a liquid vehicle, a cellulosic binder, and an acetate salt stabilizer. Even a small amount of acetate salt stabilizer can increase the strength of the mixture while simultaneously, and surprisingly, improving skin properties upon extrusion. The metal acetate stabilizer is largely insensitive to the ceramic forming component of the mixture and after firing leaves substantially no organic residue in the mixture.

In embodiments, the ceramic forming component can comprise any convenient ceramic material. The liquid vehicle can comprise any suitable liquid, such as water, alcohols, glycerin, organic solvents, and like liquids, or a mixture thereof. The acetate salt can include a cation and an acetate anion. Cations can include, for example, ammonium ($NH^{+1}$) cation and metal cations such as alkali metal cations and alkali earth metal cations. The mixture can comprise, for example, up to about 5 wt % of the acetate salt and preferably from about 0.2 to about 1.5 wt. % of the acetate salt. In embodiments, the mixture can include a ceramic forming component comprising a plurality of ceramic forming components, water, methylcellulose, and magnesium acetate. The ceramic forming component can include up to about 40 wt. % hydrated and calcined clays.

In embodiments, the mixture can be formed by, for example, blending a ceramic forming component, a liquid vehicle, a cellulosic, and a stabilizer comprising an acetate salt. The mixture can include, for example, from about 65 to about 80 wt. % ceramic forming component, from about 10 to about 40 wt. % liquid vehicle, from about 1 to about 7 wt. % binder, and up to about 5 wt. % stabilizer. The ceramic forming component can be selected based on the particular application, and can include any suitable ceramic compound, for example, alumina, silica, cordierite, talc, hydrous clay, calcined clay, graphite, titanium oxide, lanthanum oxide, strontium carbonate, zirconia, magnesia, silicate, spinels, or a mixture thereof. The liquid vehicle can comprise any suitable liquid such as, for example, water, alcohols, glycerin, an organic solvent, and like liquids, or mixtures thereof. Optionally, the mixture can include a processing aid such as a lubricant, oil, surfactant, or like material, and combinations thereof. The mixture can comprise, for example, up to about 10 wt. % of a processing aid.

The amount of stabilizer in the mixture can vary and can preferably be up to about 3 wt. %, and more preferably can be present in an amount from about 0.2 wt. % to about 1.5 wt. %. The stabilizer includes an acetate salt, that is, a cation and an acetate anion. Cations can include, for example, an ammonium cation and metal cations such as alkali and alkali earth metal cations. In embodiments, the cation is preferably not chelating. Suitable acetate salts can include, for example, barium acetate, magnesium acetate, sodium acetate, potassium acetate, ammonium acetate, and like acetates, or a mixture thereof.

The stabilizer increases the cohesiveness of the mixtures. Earlier work increased a mixture's cohesiveness by increasing amounts of cellulosic binder. Higher binder content increases the organic load in the mixture, which can increase cracking during firing. Higher organic load also limits the composition of the mixture because of incompatibility of the binder with certain ceramic forming components, liquid vehicles, lubricants, and surfactants. Acetate salts can substantially improve a mixture's cohesiveness and toughness without increasing the organic load. The increased cohesiveness and toughness enables a wider selection of raw materials and chemistries. For example, elevated levels of certain cellulosic binders prevent the use of low-cost bleached hydrous clays. Such bleached clays have no effect on acetate salt stabilizers.

In embodiments, the ceramic article can be made by a method comprising forming a mixture by blending a ceramic forming component with a liquid vehicle, a cellulosic binder, and a stabilizer comprising an acetate salt; extruding the mixture through a die to form a ceramic green body; drying the ceramic green body to remove at least a portion of the liquid vehicle; and firing the ceramic green body to obtain the porous ceramic article.

In embodiments, the ceramic article includes a honeycomb filter comprising cordierite. The ceramic green body can be dried to remove at least a portion of the liquid vehicle, and can then be fired at an elevated temperature to form a ceramic article. The ceramic green body of the disclosure possesses excellent strength and excellent skin properties. In embodiments, the method includes extruding the mixture through a die to produce a porous ceramic green body precursor.

The disclosed methods can include extruding, such as through a die, the mixture to form a ceramic green body. The die can be of any convenient shape for producing the desired conformation. In embodiments, the die produces a honeycomb ceramic green body.

In embodiments, the ceramic article can be formed by extruding the mixture to form a ceramic green body, drying at least a portion of the liquid vehicle from the ceramic green body, and firing the ceramic green body at an elevated temperature. Drying can be accomplished by any method known to one skilled in the art including exposure to a low humidity environment, heating, or forced air. The elevated temperature needed for firing will depend on the ceramic composition of the mixture. Generally, the elevated temperature can be at least about 500° C. and preferably can be above about 700° C.

EXAMPLES

The following examples serve to more fully describe the manner of using the above-described disclosure, and further set forth best modes contemplated for carrying out various aspects of the disclosure. These examples do not limit the true scope of this disclosure, but rather are presented for illustrative purposes.

Example 1

The stabilizer can significantly increase the strength of the mixture while preserving good skin properties. Mixtures A and B were prepared with each including cordierite, water, and methylcellulose. Magnesium acetate was added to Mixture B as a 5 wt. % aqueous solution until the amount of magnesium acetate in the mixtures reached 1.3 wt. %. Mixtures A and B were separately extruded through a honeycomb die to form porous ceramic green bodies. The honeycomb die extrusion apparatus included the honeycomb die and a cylindrical flow plate, the diameter of which controlled how much mixture flowed to the skin forming zone of the die to form the skin. Varying the flow plate diameter affected the skin thickness. Larger flow plate diameters produced more skin flow and thicker skin on the porous ceramic green body. A robust mixture should form good skin regardless of skin thickness. The initial flow plate diameter was set at 1.567 inches (3.98 centimeters), and was designated (000). The mixtures were also extruded through flow plate apertures of 1.477 inch (3.751 centimeters) or (−090), 1.507 inch (3.82 centimeters) or (−060), 1.627 inch (4.132 centimeters) or (+060), and 1.677 inch (4.23 centimeters) or (+100). The skin conditions of the porous ceramic green bodies were noted. After extruding the porous ceramic green bodies, the honeycomb die was replaced by a ribbon die to extrude ribbons. Ribbons were cut into dog bone-shaped specimens, and tensile tested according to ASTM D638-03. A ball-drop test was also performed on the ribbons to determine the stiffness of a mixture. The ball-drop test consists of placing a stainless steel ball on the ribbon for ten seconds and measuring the vertical indentation in the ribbon caused by the weight of the ball. The result is given in millimeters. At least seven specimens were tested for each mixture.

Mixture A had poor skin at flow plate apertures of less than +100. At +100, the porous ceramic green body of Mixture A had noticeable streaking but was not cracked. Mixture B had acceptable skin at all flow plate apertures with no streaking or cracking. Mechanical properties of the mixtures are given in Table 1.

TABLE 1

| Mixture | Breaking Strain, % | Secant Modulus, MPa | Peak Load, N | Ball Drop, mm |
|---|---|---|---|---|
| A | 6 | 1.5 | 2.8 | 7.8 |
| B | 16 | 2.5 | 3.8 | 6.8 |

Mixture B having the stabilizer had a breaking strain of about 250% of Mixture A. Mixture B had a greater secant modulus and peak load than Mixture A. Ribbons of Mixture B were stiffer and more elastic than Mixture A. Porous ceramic green bodies of Mixture B were also stiffer as measured by the ball drop test. Testing confirmed that Mixture B had superior skin properties at all flow plate diameters, while simultaneously having superior breaking strain, secant modulus, peak load, and stiffness. Mixture B produced a ceramic green body that was stronger, stiffer, yet surprisingly produced a better skin than Mixture A.

Example 2

Mixtures A to E were prepared comprising cordierite, water, and methylcellulose. An acetate salt was added to Mixtures B to E as a 5 wt. % aqueous solution until the mixture comprise 1.3 wt. % acetate salt. Mixtures B to E included magnesium acetate, barium acetate, ammonium acetate, and sodium acetate, respectively. The mixture was extruded through a ribbon die to form a ribbon and tested. The peak load and breaking strain were performed as described in Example 1. Results are shown in Table 2.

TABLE 2

| Mixture | Acetate salt | Peak Load, N | Breaking Strain, % |
|---|---|---|---|
| A | None | 2.5 | 4.1 |
| B | Magnesium | 3.0 | 8.2 |
| C | Barium | 3.8 | 7.0 |
| D | Ammonium | 3.5 | 9.5 |
| E | Sodium | 3.3 | 11.5 |

Mixtures including acetate salts had significantly higher peak loads and breaking strain than the control without an acetate salt. Mixture E with sodium acetate had a breaking strain nearly three times that of the control.

Example 3

Mixture HA was prepared including a hydrous clay and water. Mixtures HB to HE were prepared including a hydrous clay and an aqueous solution of about 5 wt. % of a magnesium salt. The aqueous solution was added until the magnesium salt in the mixture comprised about 1.3 wt. % of the mixture. The same amount of water was present in Mixtures HA to HE. Mixtures HB to HE included magnesium acetate, magnesium nitrate, magnesium chloride, and magnesium sulfate, respectively. The mixture was extruded through a ribbon die to form a ribbon and tested. The breaking strain was determined as described in Example 1. The breaking strains, in %, of Mixtures HA to HE were 6.0, 15.8, 6.0, 10.0, and 7.8, respectively. The magnesium acetate salt increased the breaking strain by more than about 250%. Of the remaining magnesium salts, only magnesium chloride showed a marginal increase in breaking strain.

The disclosure has been described with reference to various specific embodiments and techniques. However, many variations and modifications are possible while remaining within the spirit and scope of the disclosure.

What is claimed:

1. A method of forming a honeycomb green body, the method comprising:
    forming an extrudable mixture of a ceramic forming component, an aqueous liquid vehicle, an alkyl cellulosic binder, and an extrudable mixture stabilizer comprising a source of acetate anion in an amount of from 0.2 to 1.5 wt % added to the mixture as an aqueous solution; and
    extruding the mixture to form the honeycomb green body having superior strength properties as measured by breaking strain, scant modulus, peak load, and stiffness, and superior skin properties as measured by the absence of streaking or cracking, the superior strength and superior skin properties being compared to a green body prepared without the stabilizer, wherein the source of an acetate anion stabilizer includes a cation selected from a group consisting of an alkali metal cation, an alkali earth metal cation, ammonium cation, and a mixture thereof.

2. The method of claim 1, further comprising drying the ceramic honeycomb green body to remove at least a portion of the aqueous liquid vehicle.

* * * * *